United States Patent
Kodama et al.

(10) Patent No.: US 8,090,868 B2
(45) Date of Patent: Jan. 3, 2012

(54) LOAD BALANCER HAVING BAND CONTROL FUNCTION AND SETTING METHOD THEREOF

(75) Inventors: Akihiro Kodama, Fukuoka (JP);
Tomoyuki Uekado, Fukuoka (JP);
Masataka Mukaihara, Fukuoka (JP);
Yuji Ito, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 236 days.

(21) Appl. No.: 12/292,470

(22) Filed: Nov. 19, 2008

(65) Prior Publication Data
US 2009/0187660 A1 Jul. 23, 2009

(30) Foreign Application Priority Data
Jan. 22, 2008 (JP) ................. 2008-011950

(51) Int. Cl.
*G06F 15/16* (2006.01)
(52) U.S. Cl. ......... 709/235; 709/226; 709/232; 718/105
(58) Field of Classification Search .............. 709/203, 709/223–226, 230, 235; 718/105
See application file for complete search history.

(56) References Cited

U.S. PATENT DOCUMENTS

| | | | | |
|---|---|---|---|---|
| 6,560,199 B1 * | 5/2003 | Hoshino | ............... | 370/236 |
| 6,970,913 B1 * | 11/2005 | Albert et al. | ............... | 709/217 |
| 7,062,559 B2 | 6/2006 | Yoshimura et al. | | |
| 7,835,395 B2 * | 11/2010 | Okita et al. | ............... | 370/468 |
| 2002/0035641 A1 * | 3/2002 | Kurose et al. | ............... | 709/241 |
| 2002/0099844 A1 * | 7/2002 | Baumann et al. | ............... | 709/232 |
| 2002/0150117 A1 | 10/2002 | Baba | | |
| 2003/0069972 A1 | 4/2003 | Yoshimura et al. | | |
| 2003/0172163 A1 * | 9/2003 | Fujita et al. | ............... | 709/226 |
| 2006/0189321 A1 * | 8/2006 | Oh et al. | ............... | 455/452.2 |
| 2006/0190605 A1 * | 8/2006 | Franz et al. | ............... | 709/226 |
| 2008/0005293 A1 * | 1/2008 | Bhargava et al. | ............... | 709/223 |
| 2010/0058342 A1 * | 3/2010 | Machida | ............... | 718/1 |

FOREIGN PATENT DOCUMENTS

| | | |
|---|---|---|
| JP | 2002-290433 | 10/2002 |
| JP | 2003-124976 | 4/2003 |

* cited by examiner

*Primary Examiner* — William C. Vaughn
*Assistant Examiner* — Mohamed Ibrahim
(74) *Attorney, Agent, or Firm* — Fujitsu Patent Center

(57) ABSTRACT

A load balancer includes a configuration information receiving unit that receives configuration information having address information of all the servers to which a request is directed and the type of service provided by each server, a load balance setting unit that configures so that a request transmitted from a client is transmitted to one of the servers corresponding to a service type specified in a message in accordance with the configuration information, and a band setting unit that calculates the number of the servers for each service type in accordance with the configuration information and assigns a band of a line to each service in accordance with the calculated number.

10 Claims, 18 Drawing Sheets

| SERVER | SERVICE | LOAD BALANCING METHOD |
|---|---|---|
| 192.168.1.101 | HTTP | ROUND ROBIN |
| 192.168.1.102 | | |
| 192.168.1.103 | | |
| 192.168.1.104 | | |
| 192.168.1.105 | FTP | ROUND ROBIN |
| 192.168.1.106 | | |
| 192.168.1.107 | | |
| 192.168.1.108 | | |
| 192.168.1.109 | TELNET | ROUND ROBIN |
| 192.168.1.110 | | |

| SERVER | SERVICE | LOAD BALANCING METHOD |
|---|---|---|
| 192.168.1.111 | TELNET | - |

FIG.4A

| PHYSICAL LINE | LINE BAND | POOLED BAND (FOR EACH PORT) | SERVICE | LOAD BALANCING METHOD | BAND SETTING | SERVER | POOLED BAND (FOR EACH SERVER) | OBJECT OF DIRECTION |
|---|---|---|---|---|---|---|---|---|
| PORT A | 1 Gbps | 0 Mbps | HTTP | ROUND ROBIN | 400 Mbps | 192.168.1.101 | 0 Mbps | O |
| | | | | | | 192.168.1.102 | 0 Mbps | O |
| | | | | | | 192.168.1.103 | 0 Mbps | O |
| | | | | | | 192.168.1.104 | 0 Mbps | O |
| | | | FTP | ROUND ROBIN | 400 Mbps | 192.168.1.105 | 0 Mbps | O |
| | | | | | | 192.168.1.106 | 0 Mbps | O |
| | | | | | | 192.168.1.107 | 0 Mbps | O |
| | | | | | | 192.168.1.108 | 0 Mbps | O |
| | | | TELNET | ROUND ROBIN | 200 Mbps | 192.168.1.109 | 0 Mbps | O |
| | | | | | | 192.168.1.110 | 0 Mbps | O |

| PHYSICAL LINE | LINE BAND | POOLED BAND (FOR EACH PORT) | SERVICE | LOAD BALANCING METHOD | BAND SETTING | SERVER | POOLED BAND (FOR EACH SERVER) | OBJECT OF DIRECTION |
|---|---|---|---|---|---|---|---|---|
| PORT A | 1 Gbps | 10 Mbps | HTTP | ROUND ROBIN | 420 Mbps | 192.168.1.101 | 0 Mbps | ○ |
| | | | | | | 192.168.1.102 | 0 Mbps | ○ |
| | | | | | | 192.168.1.103 | 0 Mbps | ○ |
| | | | FTP | ROUND ROBIN | 380 Mbps | 192.168.1.104 | 0 Mbps | ○ |
| | | | | | | 192.168.1.105 | 0 Mbps | ○ |
| | | | | | | 192.168.1.106 | 0 Mbps | ○ |
| | | | | | | 192.168.1.107 | 0 Mbps | ○ |
| | | | TELNET | ROUND ROBIN | 190 Mbps | 192.168.1.108 | 0 Mbps | ○ |
| | | | | | | 192.168.1.109 | 0 Mbps | ○ |
| | | | | | | 192.168.1.110 | 0 Mbps | ○ |

| PHYSICAL LINE | LINE BAND | POOLED BAND (FOR EACH PORT) | SERVICE | LOAD BALANCING METHOD | BAND SETTING | SERVER | POOLED BAND (FOR EACH SERVER) | OBJECT OF DIRECTION |
|---|---|---|---|---|---|---|---|---|
| PORT A | 1 Gbps | 200 Mbps | HTTP | ROUND ROBIN | 500 Mbps | 192.168.1.101 | 0 Mbps | ○ |
| | | | | | | 192.168.1.102 | 0 Mbps | ○ |
| | | | | | | 192.168.1.103 | 0 Mbps | ○ |
| | | | | | | 192.168.1.104 | 0 Mbps | ○ |
| | | | FTP | ROUND ROBIN | 200 Mbps | 192.168.1.105 | 0 Mbps | ○ |
| | | | | | | 192.168.1.106 | 0 Mbps | ○ |
| | | | | | | 192.168.1.107 | 0 Mbps | ○ |
| | | | TELNET | ROUND ROBIN | 100 Mbps | 192.168.1.108 | 0 Mbps | ○ |
| | | | | | | 192.168.1.109 | 0 Mbps | ○ |
| | | | | | | 192.168.1.110 | 0 Mbps | ○ |

| PHYSICAL LINE | LINE BAND | POOLED BAND (FOR EACH PORT) | SERVICE | LOAD BALANCING METHOD | BAND SETTING | SERVER | POOLED BAND (FOR EACH SERVER) | OBJECT OF DIRECTION |
|---|---|---|---|---|---|---|---|---|
| PORT A | 1 Gbps | 200 Mbps | HTTP | ROUND ROBIN | 500 Mbps | 192.168.1.101 | 0 Mbps | ○ |
| | | | | | | 192.168.1.102 | 0 Mbps | ○ |
| | | | | | | 192.168.1.103 | 0 Mbps | ○ |
| | | | | | | 192.168.1.104 | 0 Mbps | ○ |
| | | | FTP | ROUND ROBIN | 200 Mbps | 192.168.1.105 | 0 Mbps | ○ |
| | | | | | | 192.168.1.106 | 0 Mbps | ○ |
| | | | | | | 192.168.1.107 | 0 Mbps | ○ |
| | | | TELNET | ROUND ROBIN | 48 Mbps | 192.168.1.108 | 0 Mbps | ○ |
| | | | | | | 192.168.1.109 | 0 Mbps | ○ |
| | | | | | | 192.168.1.110 | 0 Mbps | × |

| PHYSICAL LINE | LINE BAND | POOLED BAND (FOR EACH PORT) | SERVICE | LOAD BALANCING METHOD | BAND SETTING | SERVER | POOLED BAND (FOR EACH SERVER) | OBJECT OF DIRECTION |
|---|---|---|---|---|---|---|---|---|
| PORT A | 1 Gbps | 252 Mbps | HTTP | ROUND ROBIN | 500 Mbps | 192.168.1.101 | 0 Mbps | ○ |
| | | | | | | 192.168.1.102 | 0 Mbps | ○ |
| | | | | | | 192.168.1.103 | 0 Mbps | ○ |
| | | | | | | 192.168.1.104 | 0 Mbps | ○ |
| | | | FTP | ROUND ROBIN | 200 Mbps | 192.168.1.105 | 0 Mbps | ○ |
| | | | | | | 192.168.1.106 | 0 Mbps | ○ |
| | | | | | | 192.168.1.107 | 0 Mbps | ○ |
| | | | TELNET | ROUND ROBIN | 48 Mbps | 192.168.1.108 | 0 Mbps | ○ |
| | | | | | | 192.168.1.109 | 0 Mbps | ○ |
| | | | | | | 192.168.1.110 | 0 Mbps | × |

| PHYSICAL LINE | LINE BAND | POOLED BAND (FOR EACH PORT) | SERVICE | LOAD BALANCING METHOD | BAND SETTING | SERVER | POOLED BAND (FOR EACH SERVER) | OBJECT OF DIRECTION |
|---|---|---|---|---|---|---|---|---|
| PORT A | 1 Gbps | 252 Mbps | HTTP | ROUND ROBIN | 500 Mbps | 192.168.1.101 | 0 Mbps | O |
| | | | | | | 192.168.1.102 | 0 Mbps | O |
| | | | | | | 192.168.1.103 | 0 Mbps | O |
| | | | FTP | ROUND ROBIN | 200 Mbps | 192.168.1.104 | 0 Mbps | O |
| | | | | | | 192.168.1.105 | 0 Mbps | O |
| | | | | | | 192.168.1.106 | 0 Mbps | O |
| | | | TELNET | ROUND ROBIN | 48 Mbps | 192.168.1.107 | 0 Mbps | O |
| | | | | | | 192.168.1.108 | 0 Mbps | O |
| | | | | | | 192.168.1.109 | 0 Mbps | O |

| PHYSICAL LINE | LINE BAND | POOLED BAND (FOR EACH PORT) | SERVICE | LOAD BALANCING METHOD | BAND SETTING | SERVER | POOLED BAND (FOR EACH SERVER) | OBJECT OF DIRECTION |
|---|---|---|---|---|---|---|---|---|
| PORT A | 1 Gbps | 150 Mbps | HTTP | ROUND ROBIN | 500 Mbps | 192.168.1.101 | 0 Mbps | ○ |
| | | | | | | 192.168.1.102 | 0 Mbps | ○ |
| | | | | | | 192.168.1.103 | 0 Mbps | ○ |
| | | | | | | 192.168.1.104 | 0 Mbps | ○ |
| | | | FTP | ROUND ROBIN | 200 Mbps | 192.168.1.105 | 0 Mbps | ○ |
| | | | | | | 192.168.1.106 | 0 Mbps | ○ |
| | | | | | | 192.168.1.107 | 0 Mbps | ○ |
| | | | | | | 192.168.1.108 | 0 Mbps | ○ |
| | | | TELNET | ROUND ROBIN | 150 Mbps | 192.168.1.109 | 0 Mbps | ○ |
| | | | | | | 192.168.1.110 | 0 Mbps | ○ |
| | | | | | | 192.168.1.111 | 0 Mbps | ○ |

| SERVICE | DATA AMOUNT (FOR EACH SERVICE) | SERVER | DATA AMOUNT (FOR EACH SERVER) |
|---|---|---|---|
| HTTP | 117889147504 BITS | 192.168.1.101 | 30509000485 BITS |
| | | 192.168.1.102 | 27250757714 BITS |
| | | 192.168.1.103 | 29027981044 BITS |
| | | 192.168.1.104 | 31101408261 BITS |
| FTP | 54501515429 BITS | 192.168.1.105 | 13329174969 BITS |
| | | 192.168.1.106 | 16883621627 BITS |
| | | 192.168.1.107 | 11255747752 BITS |
| | | 192.168.1.108 | 13032971081 BITS |
| TELNET | 27250757714 BITS | 192.168.1.109 | 11848155528 BITS |
| | | 192.168.1.110 | 15402602186 BITS |

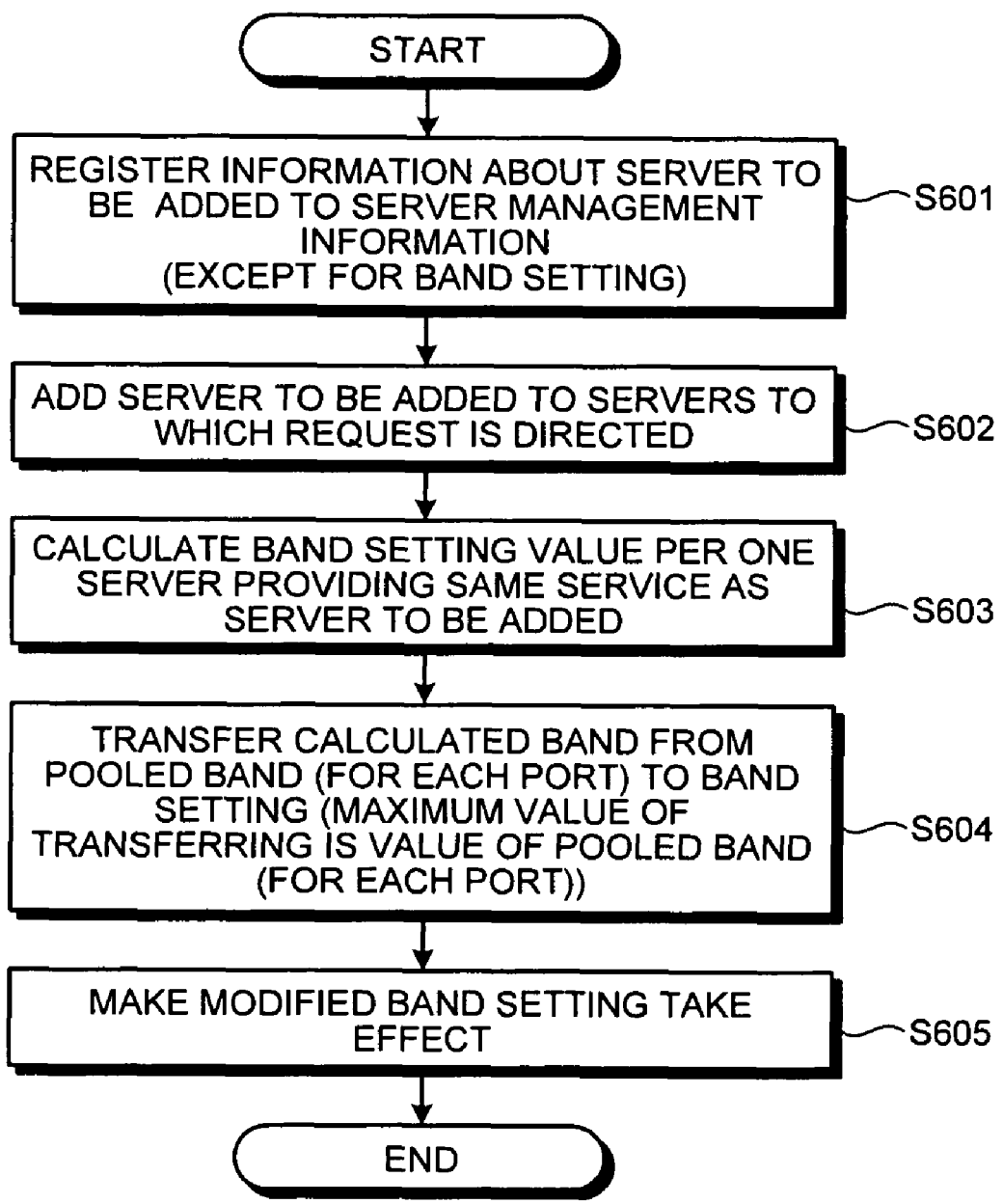

LOAD BALANCER HAVING BAND CONTROL FUNCTION AND SETTING METHOD THEREOF

CROSS-REFERENCE TO RELATED APPLICATIONS

This application is based upon and claims the benefit of priority of the prior Japanese Patent Application No. 2008-011950, filed on Jan. 22, 2008, the entire contents of which are incorporated herein by reference.

BACKGROUND

1. Field

The present invention relates to a load balancer having a band control function and a setting method thereof, and more particularly, to a load balancer in which a load balancing function setting and a band control function setting can be easily performed and a setting method thereof.

2. Description of the Related Art

A load balancer is an apparatus whose purposes are to avoid poor quality of a service provided by a plurality of servers due to centralized load thereon and to provide comfortable service to a client. More specifically, a load balancer forms a server group including a plurality of servers that provide the same service, and requests from a client are directed to servers in the server group, thereby reducing loads on the servers.

A band control apparatus is an apparatus whose purposes are to guarantee quality of a service having a higher priority than various other services provided by the servers whose band should not be strained and to limit a service having a lower priority. More specifically, a band control apparatus assigns an appropriate band to each communication line, thereby controlling a band used by each service.

Thus, a load balancer and a band control apparatus are used for improving quality of service. Therefore, they are often used in combination with each other. In recent years, an apparatus in which a load balancing function and a band control function are integrated is used.

Typically, when a load balancing function and a band control function are used in combination with each other, an administrator is required to first consider types of services to provide and performance of servers, then set up a load balancing function, predict the amount of a band used by each server, consider band control condition, and finally set up band control function. If, for example, the number of servers fluctuates, the settings are required to be reviewed and accordingly be performed again.

For example, if a server is added to or removed from a server group, a load balancing condition is required to be reviewed and a load balancing function is required to be set up again, as well as a band control condition is required to be reviewed and a band control function setting is required to be performed again so that traffic between a load balancing function and a server group is appropriate. If a server has a failure or is recovered therefrom, the number of servers also fluctuates. Therefore, a setting for a load balancing function and a band control function is required to be considered again. The consideration of appropriate settings for a load balancing function and band control function is a difficult task that requires knowledge and experience thereabout. The task is significant burden for an administrator.

To reduce such a load on an administrator, in Japanese Patent Application Laid-open No. 2003-124976, a technology for automatically correcting a band control condition is disclosed. According to the disclosed technology, if user load fluctuates in a data center, resources assigned to the user in accordance with the load can be dynamically modified, and security for the user can be secured.

In the conventional technology disclosed in Japanese Patent Application Laid-open No. 2003-124976, an administrator of a load balancer is required to perform initial setting of a load balancing function and a band control function in advance. Therefore, even if the conventional technology is used for the load balancer, the administrator is still required to consider the initial setting. Therefore, loads on the administrator who performs the initial setting are yet to be reduced.

SUMMARY

It is an object of the present invention to at least partially solve the problems in the conventional technology.

According to an aspect of an embodiment, a load balancer having a load balancing function for directing a request transmitted from a client to one of a plurality of servers and a band control function for performing band control of a line through which the directed request is transmitted, includes an information receiving unit that receives information including address information of all the servers to which the request is directed and a type of service provided by each of the servers; a load balance setting unit that configures so that the request transmitted from the client is transmitted to one of the servers corresponding to the service type specified by a message in accordance with the information received by the information receiving unit; and a band setting unit that calculates number of the servers for each service type in accordance with the information received by the information receiving unit and assigns a band in the line to each service in according with the calculated number of the servers.

According to another aspect of an embodiment, a method for setting a load balancing function for directing a request transmitted from a client to one of a plurality of servers, and a band control function for performing band control of a line through which the directed request is transmitted, includes receiving information including address information of all the servers to which the request is directed and a type of service provided by each of the servers; directing the request transmitted from the client to one of the servers corresponding to the service type specified by a message in accordance with the received information including the address information and the type of service with respect to the server to which the request is directed; calculating number of the servers for each service type in accordance with the received information; and assigning a band in the line to each service in according with the calculated number of the servers.

According to still another aspect of an embodiment, a computer program product causes a computer to perform the method according to the present invention.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 3A is a diagram of an example of configuration information;

FIG. 3B is a diagram of an example of configuration information when a server is added thereto;

FIG. 4A is a diagram of an example of server management information;

FIG. 4B is a diagram of an example of server management information during band optimization process;

FIG. 4C is a diagram of an example of server management information after the band optimization process;

FIG. 4D is a diagram of an example of server management information when a server down is detected;

FIG. 4E is a diagram of an example of server management information after a predetermined time passes before server recovery;

FIG. 4F is a diagram of an example of server management information after a server is removed therefrom;

FIG. 4G is a diagram of an example of server management information after a server is added thereto;

FIG. 5 is a diagram of an example of traffic aggregation result;

FIG. 12 is a flowchart of procedures performed during server adding process.

DETAILED DESCRIPTION OF THE PREFERRED EMBODIMENTS

Exemplary embodiments of a load balancer and a setting method thereof according to the present invention are described below in greater detail with reference to the accompanying drawings.

Figure 1:
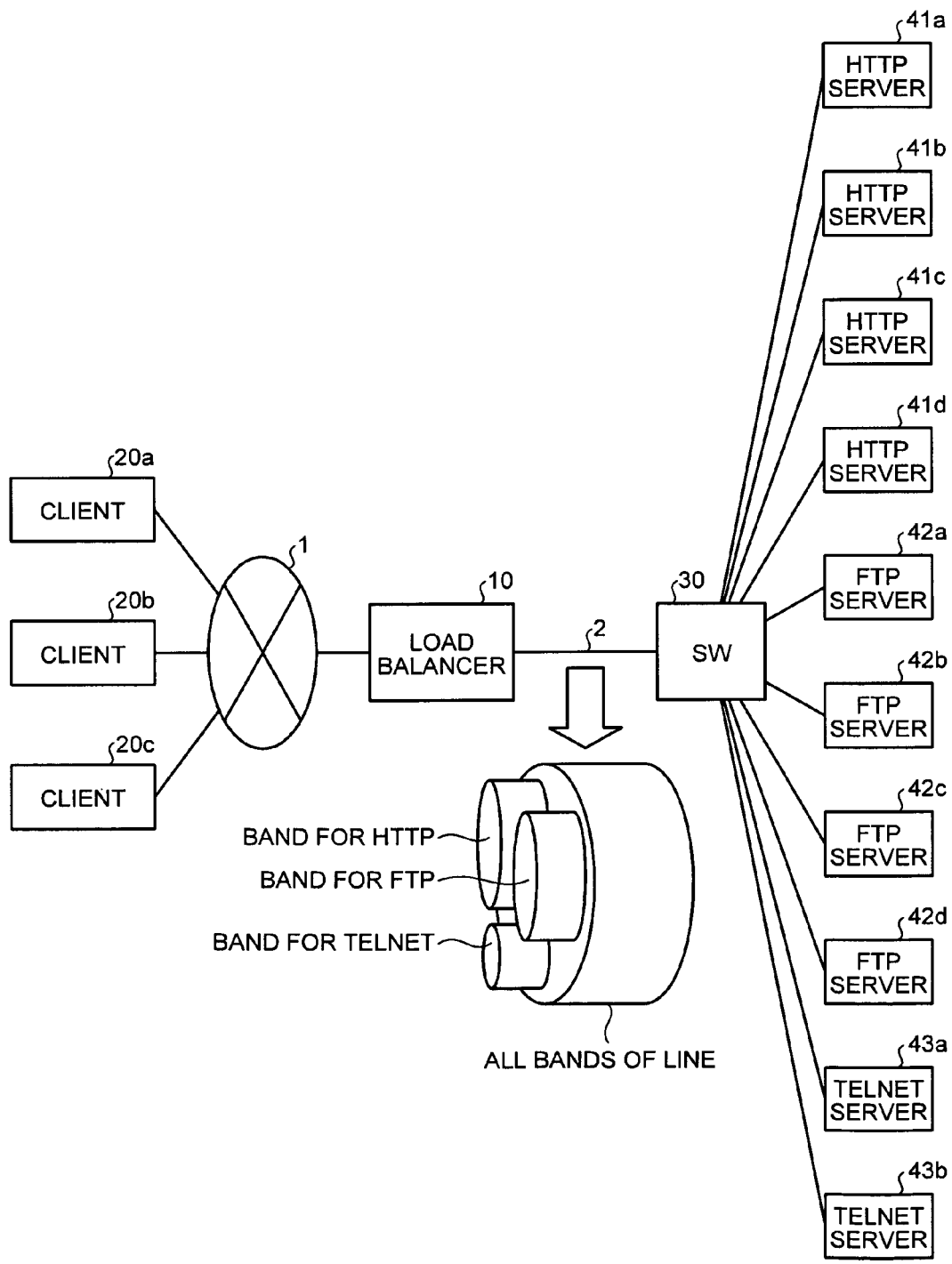
FIG. 1 is a diagram of an example of network configuration including a load balancer according to an embodiment.

Network configuration of a load balancer 10 according to an embodiment is described here in greater detail. FIG. 1 is a diagram of an example of network configuration including a load balancer according to the present embodiment. As shown in FIG. 1, the load balancer 10 is connected to clients 20a to 20c via a network 1, as well as to HTTP servers 41a to 41d, FTP servers 42a to 42d, and Telnet servers 43a and 43b via a network 2. The network 1 is, for example, the Internet, and the network 2 is a local area network (LAN) that connects various devices via a switch (SW) 30.

The load balancer 10 has a load balancing function. When the load balancer 10 receives a request from at least one client selected from any of the clients 20a to 20c, the load balancing function directs the request to a server that provides service corresponding to the request or message. For example, when the load balancer 10 receives an HTTP request from the client 20a, the load balancer directs the request to any one of the HTTP servers 41a to 41d that provides HTTP service, and sends the response therefrom to the client 20a.

The load balancer 10 has not only a load balancing function, but also a band control function. As shown in FIG. 1, the load balancer 10 logically divides a band of a communication line between the load balancer 10 and each server into a band for HTTP service provided by the HTTP servers 41a to 41d, a band for FTP service provided by the FTP servers 42a to 42d, and a band for Telnet service provided by the Telnet servers 43a and 43b, as well as limits each band for each service.

The load balancer 10 is configured so that a load balancing function setting and a band control function setting are automatically performed just by entering address information of each server to which a request is directed and a type of service provided by each server, thereby significantly reducing load on an administrator of the load balancer 10 who performs such settings. In FIG. 1, an example in which the switch 30 is independently provided is shown. The load balancer 10 may, however, include a network switching function corresponding to the switch 30.

Figure 2:
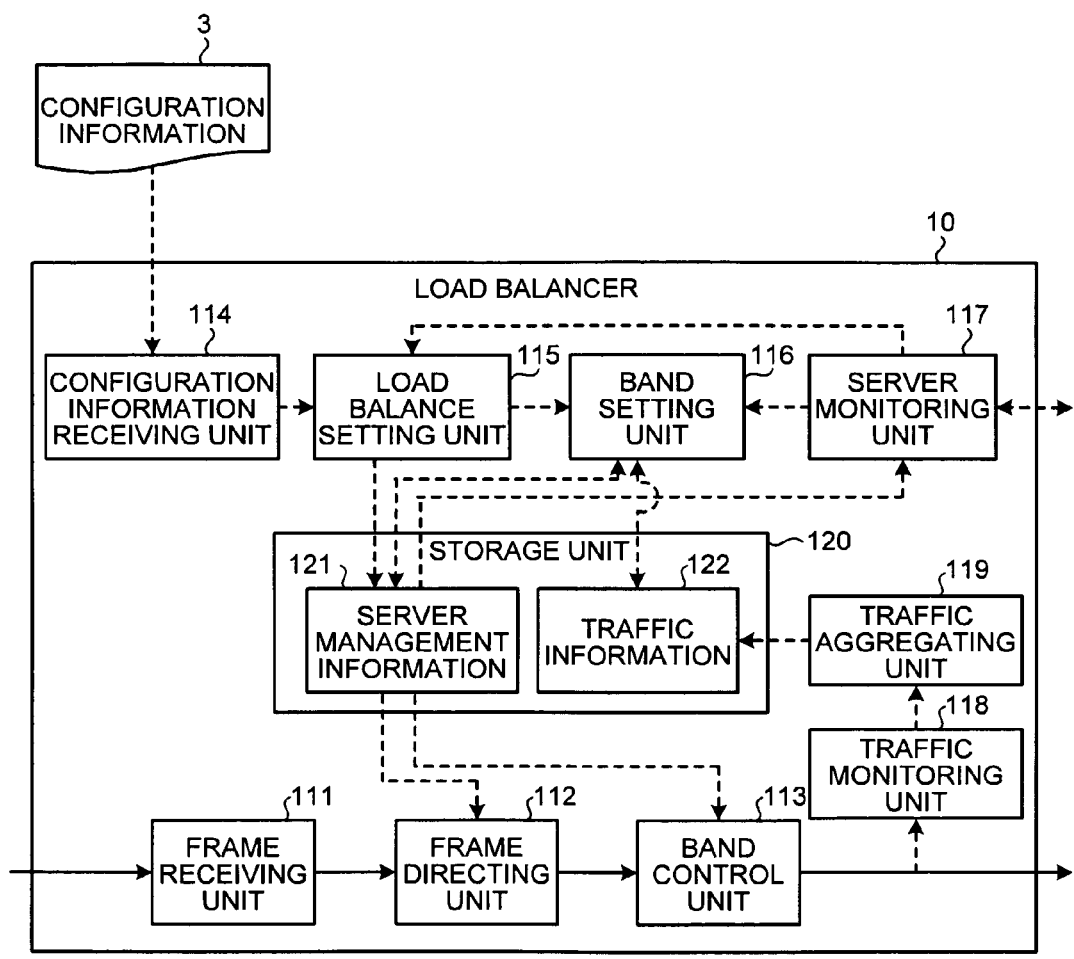
FIG. 2 is a functional block diagram of the load balancer according to the embodiment.

Configuration of the load balancer 10 shown in FIG. 1 is described here in greater detail. FIG. 2 is a functional block diagram of the load balancer 10. As shown in FIG. 2, the load balancer 10 includes a frame receiving unit 111, a frame directing unit 112, a band control unit 113, a configuration information receiving unit 114, a load balance setting unit 115, a band setting unit 116, a server monitoring unit 117, a traffic monitoring unit 118, a traffic aggregating unit 119, and a storage unit 120 that stores therein server management information 121 and traffic information 122.

In FIG. 2, configuration in which a server receives a request from a client and the server sends a response from the server to the client is not shown. In FIG. 2, a solid arrow represents flow of a main signal and a dotted arrow represents flow of information or instruction other than the main signal.

The frame receiving unit 111 receives a frame (packet) including a request from a client. The frame directing unit 112 directs the frame received by the frame receiving unit 111 to one of the servers providing a service corresponding to the request in accordance with information set in the server management information 121. The band control unit 113 limits a band of each service in accordance with the information set in the server management information 121.

The configuration information receiving unit 114 receives input of configuration information 3 that is information about adding or removing of a server to which a request is directed, and instructs the load balance setting unit 115 to perform load balancing setting in accordance with the configuration information 3 thus received. FIG. 3A is a diagram of an example of configuration information 3. More specifically, FIG. 3A is a diagram of an example of configuration information 3 at the time of an initial setting process.

As shown in FIG. 3A, the configuration information 3 has items such as SERVER, SERVICE, and LOAD BALANCING METHOD. SERVER is an item in which an IP address of a server is specified. SERVICE is an item in which a type of service provided by the server is specified. For example a value such as "HTTP", "FTP", or "Telnet" is specified therein. LOAD BALANCING METHOD is an item in which a method of directing a request to a server group providing the same type of service is specified. "Round robin" specified in the item LOAD BALANCING METHOD in FIG. 3A represents a method of directing a request to each server sequentially regardless of load condition thereof.

The load balance setting unit 115 decides load balancing setting in accordance with the configuration information 3 received by the configuration information receiving unit 114 and accordingly updates the server management information 121 as well as instructs the band setting unit 116 to perform band control setting. The load balance setting unit 115 performs a similar process also if the server monitoring unit 117 detects a server down or a server recovery. Process performed by the load balance setting unit 115 will be described later in greater detail.

An example of the server management information 121 is shown in FIG. 4A. The server management information 121 shown in FIG. 4A represents server management information after the load balancer 10 and the band setting unit 116 perform initial settings of load balancing and band control after the configuration information receiving unit 114 receives the configuration information 3 shown in FIG. 3A.

As shown in FIG. 4A, the server management information 121 has items such as PHYSICAL LINE, LINE BAND, POOLED BAND (FOR EACH PORT), SERVICE, LOAD BALANCING METHOD, BAND SETTING, SERVER, POOLED BAND (FOR EACH SERVER), and OBJECT OF DIRECTION. Among the items, values of the items PHYSICAL LINE to POOLED BAND (FOR EACH PORT) are specified for the port connected to each server, and values of the items SERVICE to BAND SETTING are specified for the service type provided by servers connected at the same port.

PHYSICAL LINE is an item in which information (for example, a physical port number) for identifying a physical line that connects the load balancer 10 and a server. LINE BAND is an item in which a value representing a band that can be provided by the physical line is specified. POOLED BAND (FOR EACH PORT) is an item in which a value representing the size of a band that is suspended without being assigned to any service and that can be assigned to any server is specified.

SERVICE is an item in which the type of a service provided by a server is specified. For example, a value such as "HTTP", "FTP", and "Telnet" is specified therein. LOAD BALANCING METHOD is an item in which a method of directing a request to a server group providing the same type of service is specified. BAND SETTING is an item in which a value representing the size of a band assigned to the service is specified.

SERVER is an item in which the IP address of the server is specified. POOLED BAND (FOR EACH SERVER) is an item in which a value representing the size of a band that is suspended without being assigned to any service and that can be assigned only to the specified server. The item is used for holding the size of a band temporarily suspended due to, for example, a server down so that the same server can use the band again. OBJECT OF DIRECTION is an item in which a value representing whether the request is directed to the servers is specified.

Referring back to FIG. 2, the band setting unit 116 performs initial setting of a band assigned to each service in accordance with the information set in the server management information 121 by the load balance setting unit 115 and updates the server management information 121 accordingly. Then, the band setting unit 116 periodically refers to the traffic information 122 holding a band usage condition for each service and corrects a band assigned to each service. The band setting unit 116 performs band setting again on receiving an instruction from the load balance setting unit 115 also if the number of servers fluctuates for some reason or other. Process performed by the band setting unit 116 will be described later in great detail.

The server monitoring unit 117 monitors whether a server registered in the server management information 121 operates normally. Server operational condition can be judged in accordance with, for example, whether the server responds to a packet for monitoring purpose. If the server monitoring unit 117 detects a server down or a server recovery, the server monitoring unit 117 notifies it to the load balance setting unit 115, so that the item, OBJECT OF DIRECTION, in the server management information 121 is updated.

The traffic monitoring unit 118 monitors a frame transmitted by the load balancer 10 to a server, and obtains the IP address of the server, the service type, and the frame size. The service type can be identified by the port number specified in a TCP header or a UDP header. The traffic aggregating unit 119 aggregates frame sizes obtained by the traffic monitoring unit 118 for each service type and each IP address, divides the results of the aggregation by the aggregation time, thereby periodically calculating bands actually used by each service and each server, and sets the bands thus obtained in the traffic information 122.

FIG. 5 is a diagram of an example of result of traffic aggregation performed by the traffic aggregating unit 119. As shown in FIG. 5, the traffic aggregating unit 119 aggregates frame sizes of the packets transferred through a line for each service such as HTTP and FTP, thereby obtaining an amount of the data transferred through the line for each service, as well as aggregates frames sizes of the packets transferred therethrough for each IP address of the servers, thereby obtaining an amount of the data transferred therethrough for each server.

Figure 6A:
FIG. 6A is a diagram of an example of traffic information.

FIG. 6A is a diagram of an example of the traffic information 122. As shown in FIG. 6A, the traffic information 122 has items such as SERVICE, OCCUPIED BAND (FOR EACH SERVICE), SERVER, and OCCUPIED BAND (FOR EACH SERVER). SERVICE is an item in which the service type provided by a server is specified. For example, a value such as "HTTP", "FTP", and "Telnet" is specified therein. OCCUPIED BAND (FOR EACH SERVICE) is an item in which the band actually used by the service is specified. SERVER is an item in which the IP address of the server is specified. OCCUPIED BAND (FOR EACH SERVER) is an item in which the band actually used by the server is specified.

Figure 7:
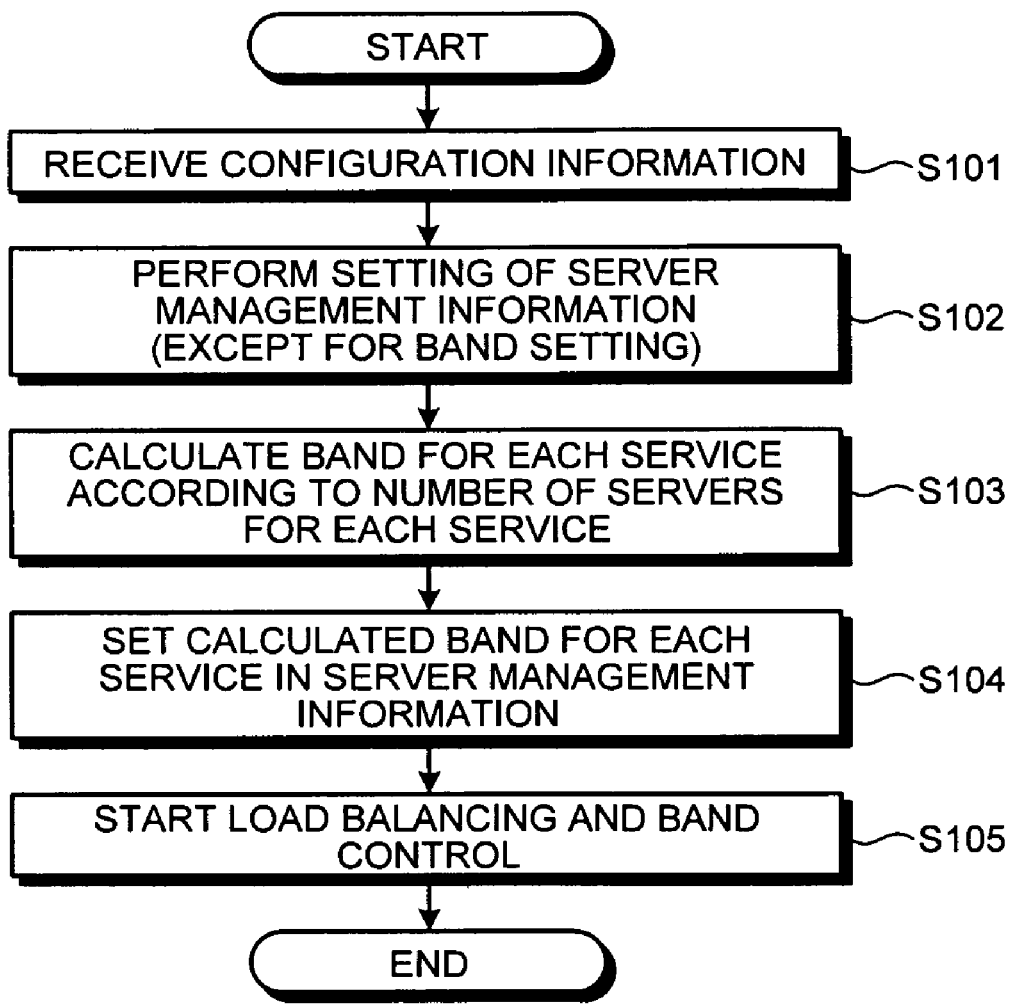
FIG. 7 is a flowchart of procedures performed during initial setting process.

Procedures of various processes performed by the load balancer 10 are described here in greater detail. FIG. 7 is a flowchart of procedures of an initial setting process. The procedures are executed when the load balancer 10 directs for the first time a request to each server.

As shown in FIG. 7, the configuration information receiving unit 114 receives the configuration information 3 for initial setting (Step S101). The load balance setting unit 115 performs setting of the items in the server management information 121 except for the item, BAND SETTING, (Step S102) in accordance with the configuration information 3 thus received.

For example, if the configuration information 3 shown in FIG. 3A is input as information for initial setting, the load balance setting unit 115 performs setting of the items in the server management information 121 except for the item, BAND SETTING, as shown in FIG. 4A. That is, a physical port number for outputting a request to each server is specified in the item, PHYSICAL LINE, a band of a line connected to the port is specified in the item, LINE BAND, and the value "0" is specified in the item, POOLED BAND (FOR EACH PORT). The values specified in the configuration information 3 are specified in the items, SERVICE and LOAD BALANCING METHOD, and the value "0" is specified in the item, BAND SETTING, as a temporary value. The value specified in the configuration information 3 is specified in the item, SERVER, the value "0" is specified in the item, POOLED BAND (FOR EACH SERVER), and information that a request is directed to the server is specified in the item, OBJECT OF DIRECTION.

The band setting unit 116 refers to the server management information 121 and divides a band of the line in proportion to the number of servers providing the same service (Step S103), and sets the result in the server management information 121 as a value in the item, BAND SETTING, for each service (Step S104). For example, if the configuration information 3 shown in FIG. 3A is input as initial setting information, a line band of 1 Gbps is divided so that a band of 400 Mbps is assigned for the HTTP service, a band of 400 Mbps is assigned for the FTP service, and a band of 200 Mbps is assigned for the Telnet service, because the number of the servers providing the HTTP service is 4, the number of the servers providing the FTP service is 4, and the number of the servers providing the Telnet service is 2, as shown in the example in FIG. 4A.

Thus, information about load balancing and band control is specified in the server management information 121, and then, the frame directing unit 112 starts a load balancing process in accordance with the information thus set in the server management information 121 (Step S105). For example, when the frame receiving unit 111 receives a HTTP request from the client 20a, the frame directing unit 112 decides a server by selecting one out of the four servers to which a HTTP service is directed in the round robin method, and the band control unit 113 performs frame buffering and discarding optionally if necessary so that the size of a band used by the HTTP service is less than 400 Mbps.

Thus, the load balancer 10 is configured so that initial setting of a load balancing function and a band control function is automatically performed just by inputting the IP address of each server to which a request of a particular service is directed and the type of the service provided by the severs. Initial setting of a band control function is performed in accordance with the number of the servers providing each service. Typically, it is assumed that the number of the servers in greater user demand is more than the number of the servers in less user demand. Thus, it is expected that appropriate band is assigned to each service. The number of the servers may be a physical number, a virtual number, or a logical number. For example, if a blade server is used, one server blade may be counted as one, or a plurality of server blades may be counted as one, that is, the number of the servers may be configured so that service demands can be compared with each other.

On performing initial setting of a band control function, the number of the servers may be evaluated by assigning weights to each server. Thus, a larger band can be assigned to a service for which servers having higher performance are provided even if the numbers of the servers are the same.

Figure 8:
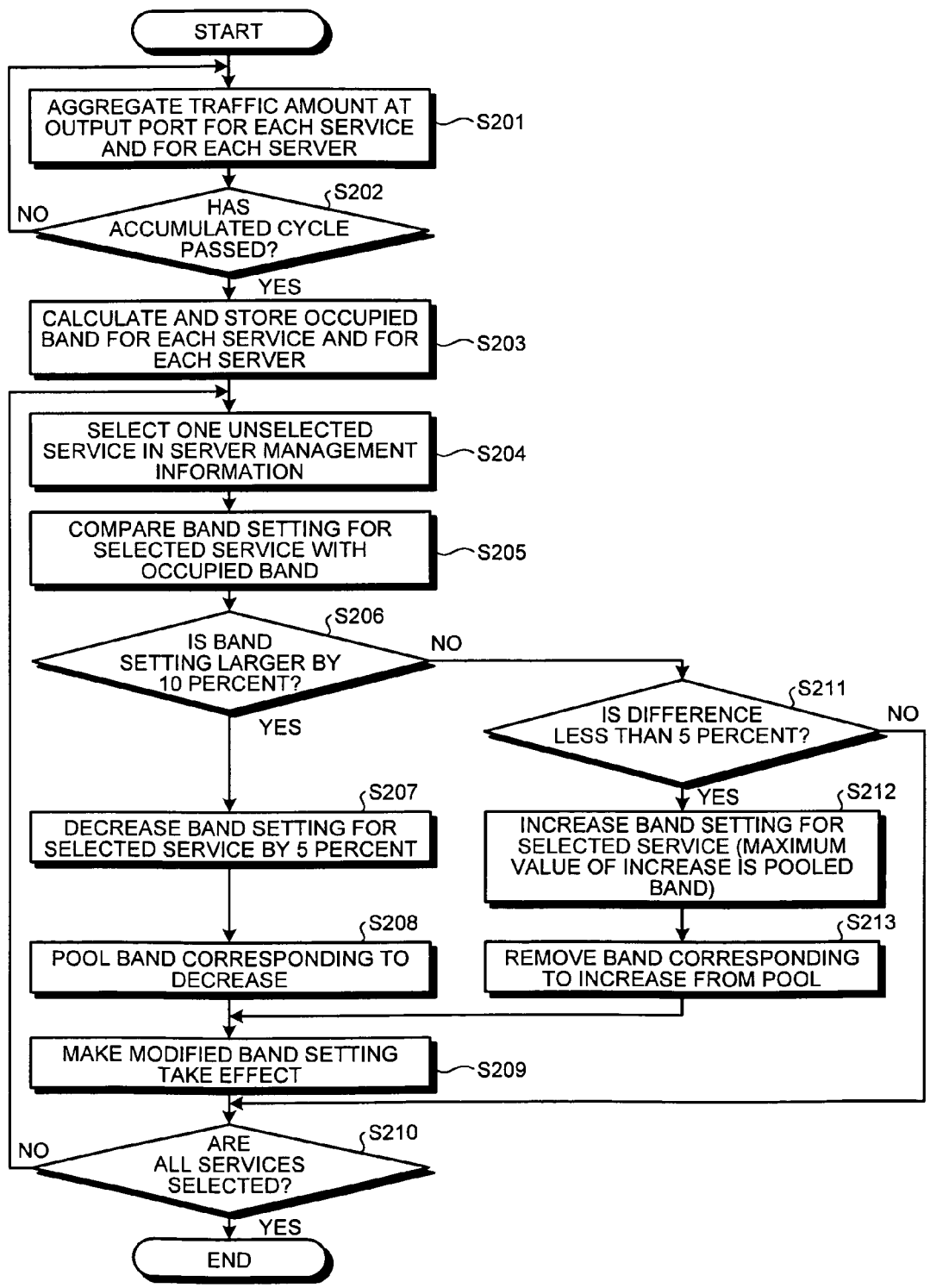
FIG. 8 is a flowchart of procedures performed during band optimization process.

FIG. 8 is a flowchart of procedures of the band optimization process. The procedures are repeatedly performed by, for example, the band setting unit 116 so that a band assigned to each service is corrected to be an optimal value in accordance with a band actually used by each service.

As shown in FIG. 8, the traffic aggregating unit 119 aggregates traffic amount of the output port for each service and each server (Step S201). The aggregation is continued (NO at Step S202) and if a predetermined accumulated cycle has passed (YES at Step S202), occupied bands are calculated for each service and each server in accordance with the aggregation result, and stored in the traffic information 122 (Step S203).

The band setting unit 116 selects one out of unselected services in the server management information 121 (Step S204), and compares the BAND SETTING value of the selected service with the OCCUPIED BAND value of the service in the traffic information 122 (Step S205). If the BAND SETTING value is higher by 10 percent, that is, more than 10 percent of the assigned band is not utilized (YES at Step S206), the band setting unit 116 reduces the BAND SETTING value of the service by 5 percent in the server management information 121 (Step S207), and adds the same amount to the item POOLED BAND (FOR EACH PORT), thereby pooling the amount (Step S208).

The band setting unit 116 makes the modified band setting take effect in the band control process performed by the band control unit 113 (Step S209). If all the services are selected in the server management information 121 (YES at Step S210), the process is terminated here. If all the services are not selected in the server management information 121 (NO at Step S210), the process starts again at Step S204.

If the difference between the BAND SETTING value of the selected service and the OCCUPIED BAND value for the service in the traffic information 122 is less than 5 percent as a result of the comparison, that is, almost all the band assigned thereto is utilized and band shortage may occur (YES at Step S211), the band setting unit 116 increases the BAND SETTING value for the service in the server management information 121 by 5 percent (Step S212), and subtracts the same amount from the POOLED BAND (FOR EACH PORT) (Step S213). The maximum increasing amount is, however, the value specified in the POOLED BAND (FOR EACH PORT). For example, even if the BAND SETTING value is 100 Mbps and if the POOLED BAND (FOR EACH PORT) value is 1 Mbps, only 1 Mbps is added to the BAND SETTING and subtracted from the POOLED BAND (FOR EACH PORT).

The band setting unit 116 makes the modified band setting take effect in the band control process performed by the band control unit 113 (Step S209). If all the services are selected (YES at Step S210), the process is terminated. If all the servers are not selected in the server management information 121 (NO at Step S210), the process starts again at Step S204.

If the difference between the BAND SETTING value of the selected service and the OCCUPIED BAND value of the service in the traffic information 122 is 5 percent or more and less than 10 percent as a result of the comparison (NO at Step S211), the band setting unit 116 maintains the current band control setting. If all the services are selected in the server management information 121 (YES at Step S210), the process is terminated. If all the services are not selected in the server management information 121 (NO at Step S210), the process starts again at Step S204.

Thus, the load balancer 10 automatically corrects a band assignment amount in accordance with actual band usage condition of each server. Therefore, the load balancer 10 can optimize band assignment amount for each service without putting load on an administrator thereof.

FIG. 4B is a diagram of an example of the server management information 121 during the band optimization process. The example shown in FIG. 4B is an example in which the contents of the server management information 121 at first are as shown in FIG. 4A and the contents of the traffic information 122 are as shown in FIG. 6A. In the example, the BAND SETTING value for the HTTP service is at first 400 Mbps, and the OCCUPIED BAND (FOR EACH SERVICE) value is 398 Mbps. Therefore, 5 percent is added to the BAND SETTING value for the HTTP service and the BAND SETTING value for the HTTP service turns to be 420 Mbps. The BAND SETTING value for the FTP service is at first 400 Mbps, and the OCCUPIED BAND (FOR EACH SERVICE) value is 184 Mbps. Therefore, 5 percent is subtracted therefrom and the BAND SETTING value for the FTP service turns to be 380 Mbps. By performing the band optimization process repeatedly, the band assignment amount for each service is gradually optimized, and the contents of the server management information 121 will be as shown, for example, in FIG. 4C.

The values shown in FIG. 8 are an example, and can be modified to be any arbitrary value. The procedures at the steps S201 to S203 and the procedures at the steps S204 to S210 may be performed asynchronously. For example, updating of the traffic information 122 at the steps S201 to S203 may be repeatedly performed and the procedures performed at the steps S204 to S210 by the band setting unit 116 may be periodically performed at a predetermined interval.

Figure 9:
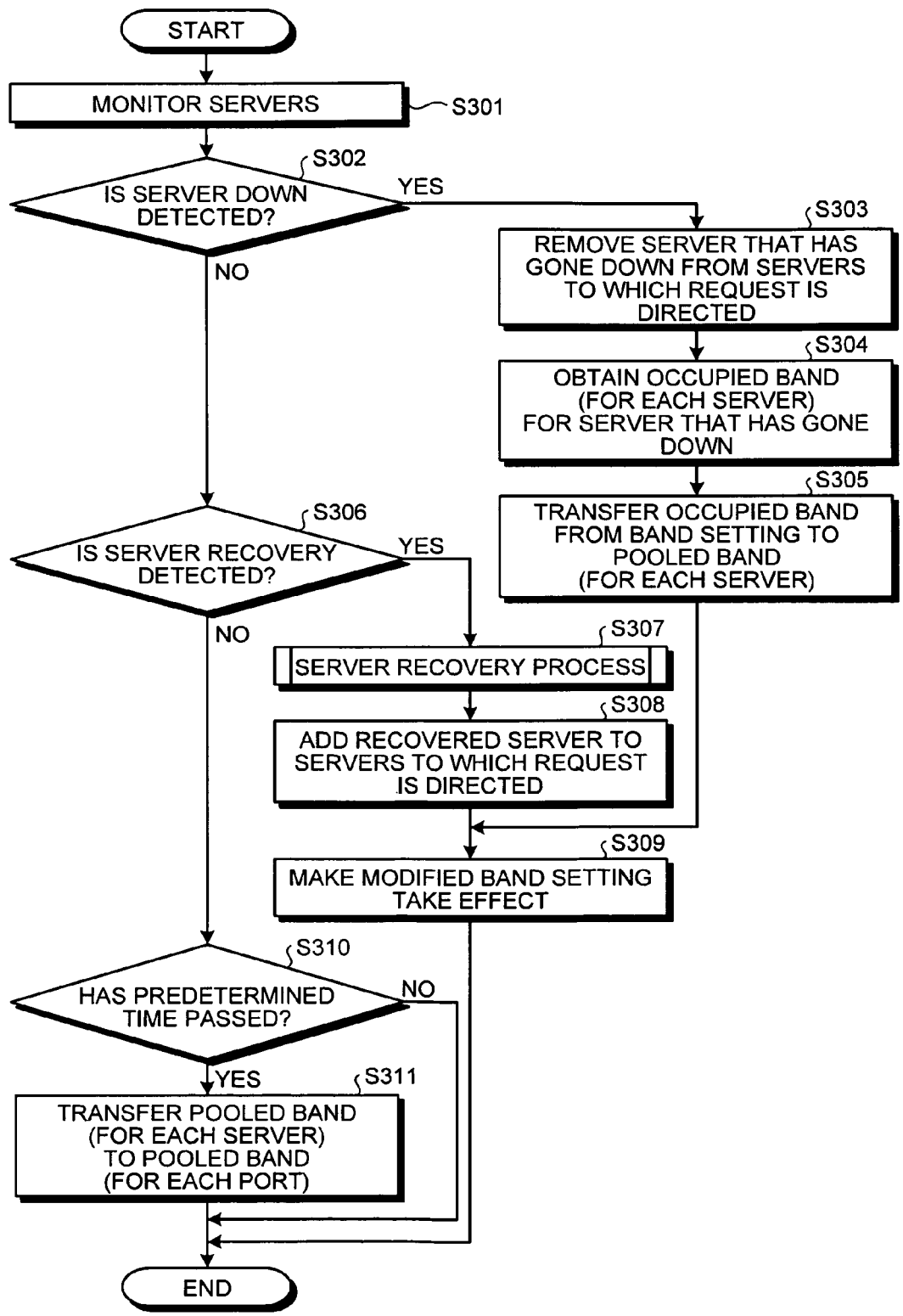
FIG. 9 is a flowchart of procedures performed during server monitoring process.

FIG. 9 is a flowchart of the procedures performed during the server monitoring process. Processing units such as the server monitoring unit 117 repeatedly perform the procedures. As shown in FIG. 9, the server monitoring until 117 monitors whether the servers registered in the server management information 121 operate normally (Step S301).

If the server monitoring unit 117 detects a server down (YES at Step S302), the load balance setting unit 115 updates the OBJECT OF DIRECTION value for the server that has gone down in the server management information 121, and thus, removes the server out of the servers to which the request is directed (Step S303). The band setting unit 116 obtains the OCCUPIED BAND (FOR EACH SERVER) value for the server that has gone down, in the traffic information 122 (Step S304). The band setting unit 116 transfers the value thus obtained in the server management information 121 from the BAND SETTING item to the POOLED BAND (FOR EACH SERVER) item for the server (Step S305). Thus, the band setting unit 116 makes the modified band setting take effect in the band control process (Step S309).

For example, if the contents of the server management information 121 are as shown in FIG. 4C and the contents of the traffic information 122 are as shown in FIG. 6A, when the server monitoring unit 117 detects that the server having the IP address of "192.168.1.110" has gone down, the OBJECT OF DIRECTION value for the server is updated as shown in FIG. 4D as well as 52 Mbps is subtracted from the BAND SETTING value for the Telnet service and added to the POOLED BAND (FOR EACH SERVER) item for the server.

Thus, if the load balancer 10 detects a server down, the load balancer 10 suspends directing a request to the server. In addition to the suspension, the load balancer 10 removes the band used by the server from the band assigned to a service provided by the server. Therefore, a server providing the same type of service provided by the server that has gone down does not have to process the requests for the server that has gone down, and sequence of troubles such as sever down or poor quality of service due to overload can be avoided.

If the server monitoring unit 117 detects a server recovery (NO at Step S302 and YES at Step S306), the band setting unit 116 performs a server recovery process that will be described in greater detail later, and additionally assigns a band for the recovered server to a service provided by the server (Step S307). The load balance setting unit 115 updates the value of the OBJECT OF DIRECTION item for the recovered server in the server management information 121, and adds the server to the servers to which the request is directed (Step S308). The band setting unit 116 makes the modified band setting take effect in the band control process (Step S309).

If the server monitoring unit 117 does not detect any server down or recovery (NO at Step S302 and NO at Step S306) and if a predetermined time passes after performing the procedure at Step S305 (YES at Step S310), the band setting unit 116 transfers to the POOLED BAND (FOR EACH PORT) item the value that is transferred to the POOLED BAND (FOR EACH SERVER) item at Step S305 that is a value representing the size of a band suspended so that the band will be assigned to a service provided by the server if the server is recovered, thereby making the band available for an arbitrary service (Step S311).

For example, if the contents of the server management information 121 are as shown in FIG. 4D and the server having the IP address of "192.168.1.110" does not recover even after a predetermined time, a 52 Mbps band suspended for the server is transferred to the POOLED BAND (FOR EACH PORT) item as shown in FIG. 4E, thereby making the band available to any arbitrary service.

Figure 10:
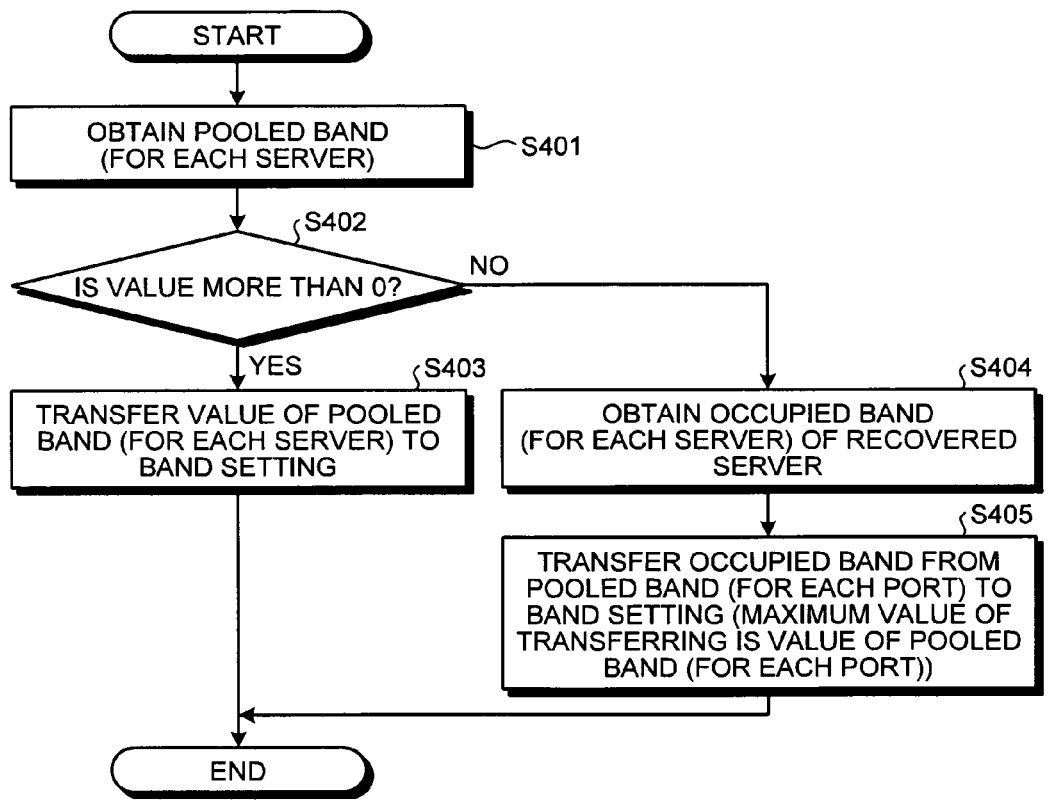
FIG. 10 is a flowchart of procedures performed during server recovery process.

FIG. 10 is a flowchart of the procedures performed during the server recovery process. The procedures are performed as a part of the server monitoring process. As shown in FIG. 10, if the server monitoring unit 117 detects a server recovery, the band setting unit 116 refers to the server management information 121 and obtains the POOLED BAND (FOR EACH SERVER) value for the server (Step S401). If the value thus obtained is above 0 (YES at Step S402), the POOLED BAND (FOR EACH SERVER) value is transferred to the BAND SETTING item for the service provided by the server (Step S403).

For example, if the contents of the server management information 121 are as shown in FIG. 4D and recovery of the server having the IP address of "192.168.1.110" is detected, a 52 Mbps band suspended for the server is added to the BAND SETTING value for the Telnet service provided by the server and subtracted from the POOLED BAND (FOR EACH SERVER) item. As a result, the values of the BAND SETTING item and the POOLED BAND (FOR EACH SERVER) item for the server management information 121 are back to the previous values before the server down is detected. Thus, a band used by a server that has gone down is suspended for the server, and the band is assigned to a service provided by the server when the server recovers. As a result, updating of the band setting at the time of server recovery can be performed quickly and appropriately.

If the POOLED BAND (FOR EACH SERVER) value for a server is 0 after a predetermined time elapses since the detection of the server down (NO at Step S402), the band setting unit 116 obtains from the traffic information 122 the value of the OCCUPIED BAND (FOR EACH SERVER) item for the server of which recovery is detected (Step S404). Then, in the server management information 121, the band setting unit 116 transfers the band having the value thus obtained from the POOLED BAND (FOR EACH PORT) item to the BAND SETTING item corresponding to the services provided by the server (Step S405). The maximum value to be transferred, however, is the value of the POOLED BAND (FOR EACH PORT).

For example, if the contents of the server management information 121 are as shown in FIG. 4E, the contents of the traffic information 122 are as shown in FIG. 6A, and recovery of the server having the IP address of "192.168.1.110" is detected, the 52 Mbps band previously used by the server is added to the BAND SETTING value for the Telnet service provided by the server and subtracted from the POOLED BAND (FOR EACH PORT) item. As a result, the values of the BAND SETTING item and the POOLED BAND (FOR EACH SERVER) item are back to the previous value before the detection of the server down.

If the POOLED BAND (FOR EACH PORT) value is not enough or is 0 at Step S405, a band assigned to a service provided by the recovered server may not be enough. Therefore, if the POOLED BAND (FOR EACH PORT) value is not enough or is 0 at Step S405, bands assigned to the services other than the service provided by the recovered server may be reduced by a predetermined percentage and the reduced amount may be added to the service provided by the recovered server.

Figure 11:
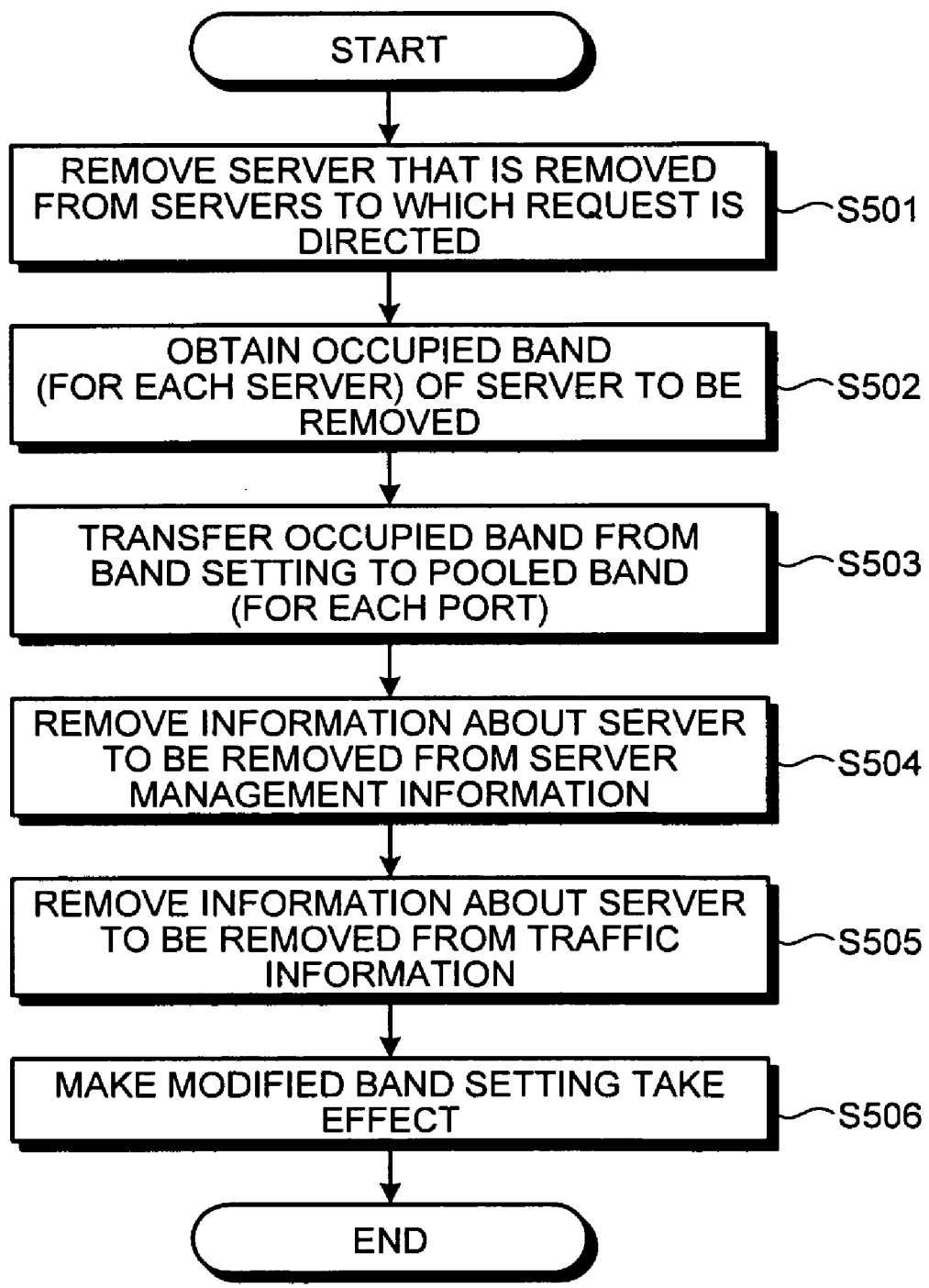
FIG. 11 is a flowchart of procedures performed during server removing process.

FIG. 11 is a flowchart of the procedures performed during server removing process. The procedures are performed if the configuration information receiving unit 114 receives the configuration information 3 indicating removal of a server. As shown in FIG. 11, if the configuration information receiving unit 114 receives the configuration information 3 indicating removal of a server, the load balance setting unit 115 updates the OBJECT OF DIRECTION value for the server to be removed in the server management information 121, and removes the server from the servers to which the request is directed (Step S501).

The band setting unit 116 obtains, from the traffic information 122, the OCCUPIED BAND (FOR EACH SERVER) value for the server to be removed (Step S502). Then, the band setting unit 116 transfers the obtained value from the BAND SETTING item for the service provided by the server to the POOLED BAND (FOR EACH PORT) in the server management information 121 (Step S503). The band setting unit 116 removes information about the removed server from the server management information 121 (Step S504) as well as from the traffic information 122 (Step S505) and makes the modified BAND SETTING take effect in the band control process (Step S506).

Figure 6B:
FIG. 6B is a diagram of an example of traffic information after a server is removed therefrom.

For example, if the contents of the server management information 121 are as shown in FIG. 4C, the contents of the traffic information 122 are as shown in FIG. 6A, and the server having the IP address of "192.168.1.110" is removed, as shown in FIG. 4F, information about the server is removed from the server management information 121 as well as 52 Mbps is subtracted from the BAND SETTING value for the Telnet service and added to the POOLED BAND (FOR EACH PORT) item. As shown in FIG. 6B, information about the server is also removed from the traffic information 122.

Thus, if the load balancer 10 receives an instruction to remove a server, the load balancer 10 suspends directing a request to the server. In addition to the suspension, the load balancer 10 removes the band used by the server from the band assigned to a service provided by the server. Therefore, a server providing the same type of service provided by the removed server does not have to process the requests for the removed server, and sequence of troubles such as server down and poor quality of service due to overload server can be avoided.

FIG. 12 is a flowchart of the procedures performed during the server adding process. The procedures are performed if the configuration information receiving unit 114 receives the configuration information 3 indicating adding of a server. As shown in FIG. 12, if the configuration information receiving unit 114 receives the configuration information 3 indicating adding of a server, in accordance with the configuration information 3 the load balance setting unit 115 registers information about the server to be added in the server management information 121 (Step S601). The BAND SETTING value is, however, not updated. The load balance setting unit 115 makes the registration of the server to be added in the server management information 121 take effect in the load balancing process (Step S602).

The band setting unit 116 refers to the server management information 121, and divides the BAND SETTING value for a service provided by the server to be added by the number of the existing servers providing the service, thereby calculating the BAND SETTING value per one server (Step S603). The band setting unit 116 transfers a band having the value thus calculated from the POOLED BAND (FOR EACH PORT) item to the BAND SETTING item for the service provided by the server to be added (Step S604). The maximum value of the transferring, however, is the value of the POOLED BAND (FOR EACH PORT). The band setting unit 116 makes the updated BAND SETTING take effect in the band control process (Step S605).

For example, if the contents of the server management information 121 are as shown in FIG. 4C and the configuration information 3 shown in FIG. 3B is received as information indicating a server to be added, as shown in FIG. 4G, information about the server having the IP address of "192.168.1.111" is added to the server management information 121, and 50 Mbps that is the BAND SETTING value per one server proving the Telnet service is added to the BAND SETTING item for the Telnet service as well as 50 Mbps is subtracted from the POOLED BAND (FOR EACH PORT).

If the POOLED BAND (FOR EACH PORT) value is not enough or is 0 at Step S604, a band assigned to a service provided by the server to be added may not be enough. Therefore, if the POOLED BAND (FOR EACH PORT) value is not enough or is 0 at Step S604, bands assigned to the services other than the service provided by the server to be added may be reduced by a predetermined percentage and the reduced amount may be added to the service provided by the server to be added.

Configuration of the load balancer 10 according to the present embodiment shown in FIG. 2 may be modified without departing from the spirit of the present invention. For example, the load balancing function and the band control function included in the load balancer 10 may be implemented as separate apparatuses and the function of the load balancer 10 may be implemented by exchanging necessary information between the apparatuses. The function of the load balancer 10 may also be implemented as computer software. Then, a computer program having the same function as the load balancer 10 may be stored in a certain storage device or a portable storage media. A processor included in a computer may reads the computer program and expands the computer program on a memory, thereby making the computer program executable. Thus, the computer functions in the same way as the load balancer 10.

As described above, in the present embodiment, initial setting necessary for band control can be automatically performed just by inputting the configuration information 3 necessary for a load balancing function. Therefore, setting of the load balancer 10 having band control function can be easily performed. In the present embodiment, a band automatically set is corrected by comparing the band automatically set with a band actually used. Therefore, the band automatically set can be optimized in accordance with usage condition of the band.

According to an aspect of the embodiments explained above, initial setting necessary for band control is automatically performed when information necessary for a load balancing function is input. Therefore, it is easy to perform setting of a load balancer having a band control function.

According to another aspect of the embodiments explained above, a band set up automatically is corrected by comparing the band set up automatically with a band used actually for the load balancer. Therefore, the band set up automatically can be optimized in accordance with usage condition of the load balancer.

According to still another aspect of the embodiments explained above, if a server goes down, the load balancer is controlled so that a band used by the server is not used any more. Therefore, the other servers do not have to process a request that should be processed by the server that has gone down. As a result, the other servers are advantageously prevented from being overloaded.

According to still another aspect of the embodiments explained above, when a server goes down, a corresponding band is suspended, and when the server is recovered from the down state, the band is recovered from the suspension. Therefore, at the time of the server recovery, an optimized band assignment condition is advantageously available more quickly.

The constituent elements, the expressions, or any combinations of the constituent elements of the present invention applied to a method, an apparatus, a system, a computer program, a recording medium, a data structure, and so forth are all effective as an embodiment of the present invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A load balancer having a load balancing function for directing a request transmitted from a client to one of a plurality of servers and a band control function for performing band control of a line through which the directed request is transmitted, the load balancer comprising:
    a processor coupled to a memory,
    wherein the processor is programmed to execute:
    receiving information including address information of all the servers to which the request is directed and a type of service provided by each of the servers using an information receiving unit;
    directing the request transmitted from the client to one of the servers corresponding to the service type specified by the request in accordance with the information received by the information receiving unit using a load balance setting unit;
    calculating number of the servers for each service type in accordance with the information received by the information receiving unit using a band setting unit; and
    dividing a band of the line in proportion to the calculated number of the servers for each service type, and assigning the divided band in the line to each service using the band setting unit.

2. The load balancer according to claim 1, wherein the processor is further programmed to execute:
    aggregating traffic of the line for each service and stores an occupied band for each service in a storage unit as traffic information using a traffic aggregating unit, wherein
    the band setting unit compares a band assigned to each service with an occupied band in the traffic information for each service and corrects a band assigned to each service in accordance with a difference thus obtained from the comparison.

3. The load balancer according to claim 2, wherein the processor is further programmed to execute:
    monitoring operational condition of each server to which the request is directed using a server monitoring unit, wherein the traffic aggregating unit further aggregates traffic of the line for each server and stores an occupied band for each server also in the storage unit as traffic information, and if the server monitoring unit detects a server that has gone down, the band setting unit obtains an occupied band for the server from the traffic information and removes a band corresponding to the obtained occupied band from a band assigned to a service provided by the server.

4. The load balancer according to claim 3, wherein if the server monitoring unit detects that one of the servers has gone down, the band setting unit holds information representing a size of the removed band in association with the server, and if the server monitoring unit detects that the server is recovered, the band setting unit increases a band assigned to a service provided by the server by the size of the band represented by the information held in association with the server.

5. The load balancer according to claim 4, wherein the band setting unit does not assign again the band removed when the server monitoring unit detects that one of the servers has gone down, until the server monitoring unit detects that the server is recovered or until a predetermined time passes, whichever may be earlier.

6. The load balancer according to claim 2, wherein if the information receiving unit receives information indicating that a server is removed, the band setting unit obtains from the traffic information an occupied band for the server, and removes a band corresponding to the obtained occupied band from a band assigned to a service provided by the server.

7. The load balancer according to claim 2, wherein if the information receiving unit receives information indicating that a server is added, the band setting unit divides a size of a band assigned to a service provided by the server by the number of the existing servers providing services, and increases a band assigned to the service by an obtained quotient.

8. The load balancer according to claim 7, wherein if an unused band does not have an enough size for the quotient, the band setting unit reduces each band assigned to other services by a predetermined percentage, and assigns the reduced band to the service.

9. A method for setting a load balancing function for directing a request transmitted from a client to one of a plurality of servers, and a band control function for performing band control of a line through which the directed request is transmitted, the method comprising:
    receiving information including address information of all the servers to which the request is directed and a type of service provided by each of the servers;
    directing the request transmitted from the client to one of the servers corresponding to the service type specified by the request in accordance with the received information including the address information and the type of service with respect to the server to which the request is directed;
    calculating number of the servers for each service type in accordance with the received information; and
    dividing a band of the line in proportion to the calculated number of the servers for each service type, and assigning the divided band in the line to each service.

10. A non-transitory computer-readable recording medium that stores therein a computer program that sets a load balancing function for directing a request transmitted from a client to one of a plurality of servers, and a band control function for performing band control of a line through which the directed request is transmitted, the computer program causing a computer to execute:

receiving information including address information of all the servers to which the request is directed and a type of service provided by each of the servers;

directing the request transmitted from the client to one of the servers corresponding to the service type specified by the request in accordance with the received information including the address information and the type of service with respect to the server to which the request is directed;

calculating number of the servers for each service type in accordance with the received information; and dividing a band of the line in proportion to the calculated number of the servers for each service type, and assigning the divided band in the line to each service.

* * * * *